(12) United States Patent
Llorente Gonzalez et al.

(10) Patent No.: US 7,546,842 B2
(45) Date of Patent: Jun. 16, 2009

(54) OIL FLUSHING EQUIPMENT FOR MACHINERY WITH ROTATING PARTS

(75) Inventors: Jose Ignacio Llorente Gonzalez, Pamplona (ES); Javier Barañano Echebarria, Pamplona (ES)

(73) Assignee: Gamesa Innovation & Technology, S.L., Pamplona (Navarra) (ES)

( * ) Notice: Subject to any disclaimer, the term of this patent is extended or adjusted under 35 U.S.C. 154(b) by 563 days.

(21) Appl. No.: 11/338,411

(22) Filed: Jan. 24, 2006

(65) Prior Publication Data

US 2006/0162751 A1    Jul. 27, 2006

(30) Foreign Application Priority Data

Jan. 27, 2005   (ES)   ............... P200500152

(51) Int. Cl.
*B08B 3/04* (2006.01)
(52) U.S. Cl. .................... 134/111; 134/116; 134/169 A
(58) Field of Classification Search ................. 134/116, 134/169 A, 184, 198, 111
See application file for complete search history.

(56) References Cited

U.S. PATENT DOCUMENTS

| | | | |
|---|---|---|---|
| 2,222,516 A * | 11/1940 | Powell et al. .................. 134/10 |
| 2,425,848 A | 8/1947 | Vawter | |
| 2,685,347 A | 8/1954 | Busby | |
| 3,954,611 A | 5/1976 | Reedy | |
| 4,059,123 A * | 11/1977 | Bartos et al. .............. 134/102.2 |
| 4,127,160 A * | 11/1978 | Joffe ........................... 165/95 |
| 4,787,348 A * | 11/1988 | Taylor .................... 123/198 A |
| 4,840,223 A * | 6/1989 | Lee ............................. 165/95 |
| 4,877,043 A * | 10/1989 | Carmichael et al. ....... 134/57 R |
| 4,951,784 A | 8/1990 | Bedi | |
| 4,977,872 A * | 12/1990 | Hartopp .................. 123/198 A |
| 5,232,513 A * | 8/1993 | Suratt et al. ................... 134/21 |
| 5,289,837 A * | 3/1994 | Betancourt ................ 134/57 R |
| 5,460,656 A * | 10/1995 | Waelput et al. ............... 134/10 |
| 6,263,889 B1 * | 7/2001 | Flynn et al. ............. 134/102.2 |
| 6,979,397 B2 * | 12/2005 | Evanovich et al. ......... 210/96.1 |
| 2004/0035805 A1 | 2/2004 | Hansen | |

FOREIGN PATENT DOCUMENTS

| | | |
|---|---|---|
| GB | 2 202 460 | 9/1988 |
| WO | 01/53723 | 7/2001 |
| WO | 01/53723 A1 | 7/2001 |
| WO | 2004/070231 A2 | 8/2004 |

* cited by examiner

Primary Examiner—Frankie L Stinson
(74) Attorney, Agent, or Firm—Ladas & Parry LLP

(57) ABSTRACT

Oil flushing equipment has four function modes (40) for machinery with rotating parts: the first fills the machinery (40) with oil from a tank (1), the second re-circulates the oil through the machinery (40), the third empties the oil from the machinery (40) to the tank (1) and the fourth cleans the oil in the tank. All four function modes use the motor pump unit (9) and a sequence of two pressure filters (19) in the equipment. The second and third function modes use a vacuum filter (22) situated between the machine (40) and the motor pump unit (9).

4 Claims, 3 Drawing Sheets

US 7,546,842 B2

OIL FLUSHING EQUIPMENT FOR MACHINERY WITH ROTATING PARTS

FIELD OF THE INVENTION

This invention refers to oil flushing equipment for machinery with rotating parts and, in particular, it refers to a flushing system for gearboxes used in wind turbines.

BACKGROUND OF THE INVENTION

U.S. Pat. No. 3,954,611 describes a method and a portable apparatus for purifying lubrication oil for machinery such as gearboxes and pump unit motors for oil wells.

Patent GB 2202460 describes an installation for the cleaning of a unit which via a pump creates the circulation of oil which passes through some filters to retain the impurities.

The patent application Ser. No. WO0153723 describes a method and a system for checking the cleanliness of the gear units used in gas turbines on aeroplanes, in which the oil that goes through the gear unit is pumped and later guided to a filter, after which the filter is removed to determine the weight of the collected particles which are then compared with the predetermined levels for the correct functioning of the gear units.

The patent application US20040035805 describes a method and an apparatus for the cleaning of various types of machine pollutants that includes hoses that connect to the machine, a pump that circulate the liquid and a low capacity filter for vaporising the fluid. It also has an automatic ventilation system which injects air into the fluid at determined time intervals.

None of the equipment described in the documents mentioned efficiently resolve the problem posed in the case of clean oil for gearboxes used in wind turbines during the hours of operation.

SUMMARY OF THE INVENTION

This invention proposes oil flushing equipment for machines with rotating parts and, in particular, gearboxes for wind turbines. This equipment consists of elements technically known as an oil tank, a motor-pump unit and oil filtration measures connected to the piping through which the oil circulates.

According to the invention, the equipment has the following essential characteristics:

The oil circulation pipes include valves that allow the differentiation of a first circuit to fill the machine with oil from the tank, a second circuit which re-circulates the oil through machinery, a third circuit to empty the gearbox of oil and to take the oil to the tank, and a fourth circuit to clean the oil deposited in the tank.

All four circuits mentioned share the motor pump and two pressure filters placed in serial.

The second and third circuits mentioned include a vacuum filter located between the machinery and the motor-pump unit.

Other characteristics and advantages of this invention can be found in the following detailed description, explaining its purpose, and associated with the attached diagrams.

DETAILED DESCRIPTION OF THE INVENTION

Figure 1:
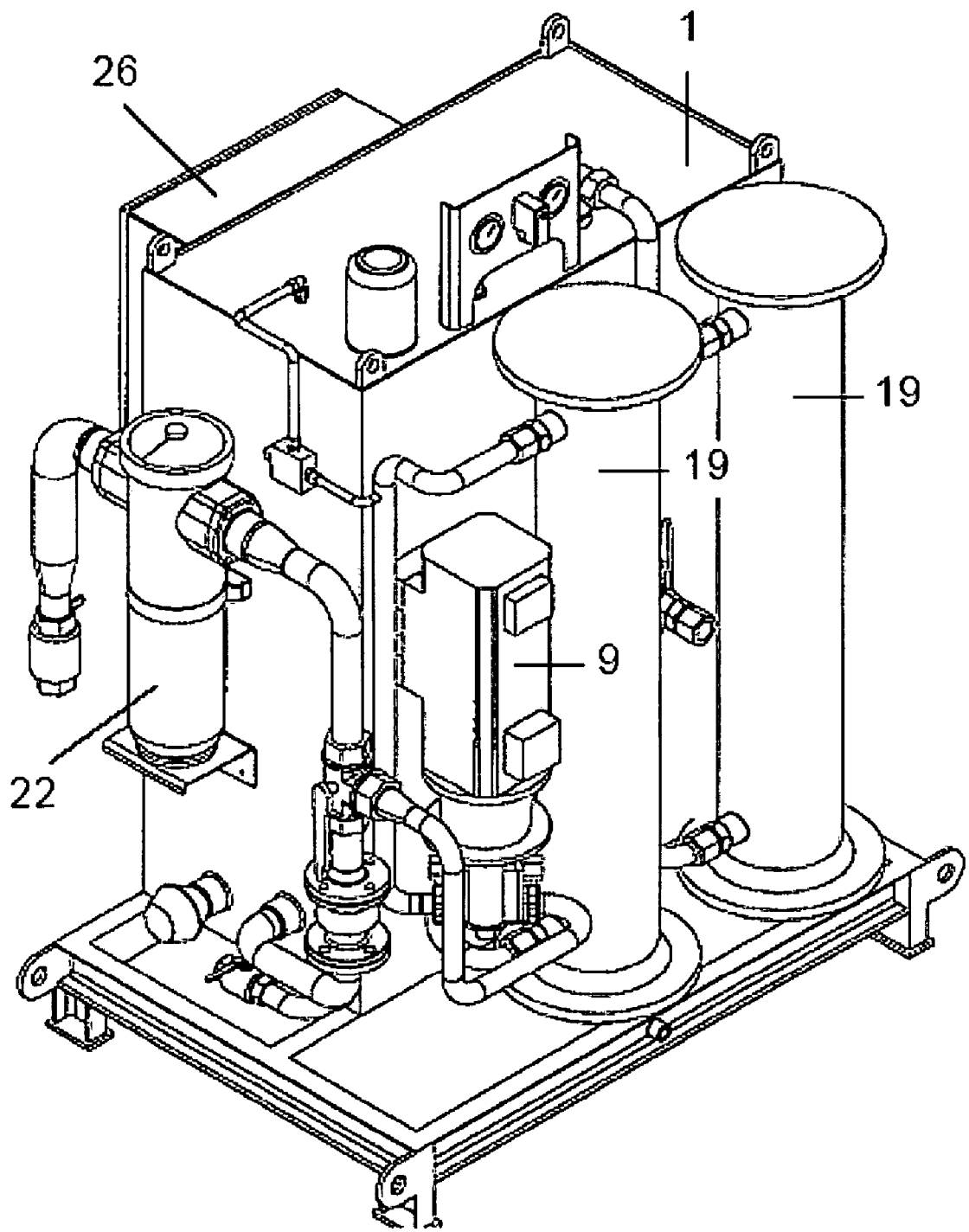
FIG. 1 shows a three-dimensional perspective of the flushing equipment according to the present invention.
Figure 2:
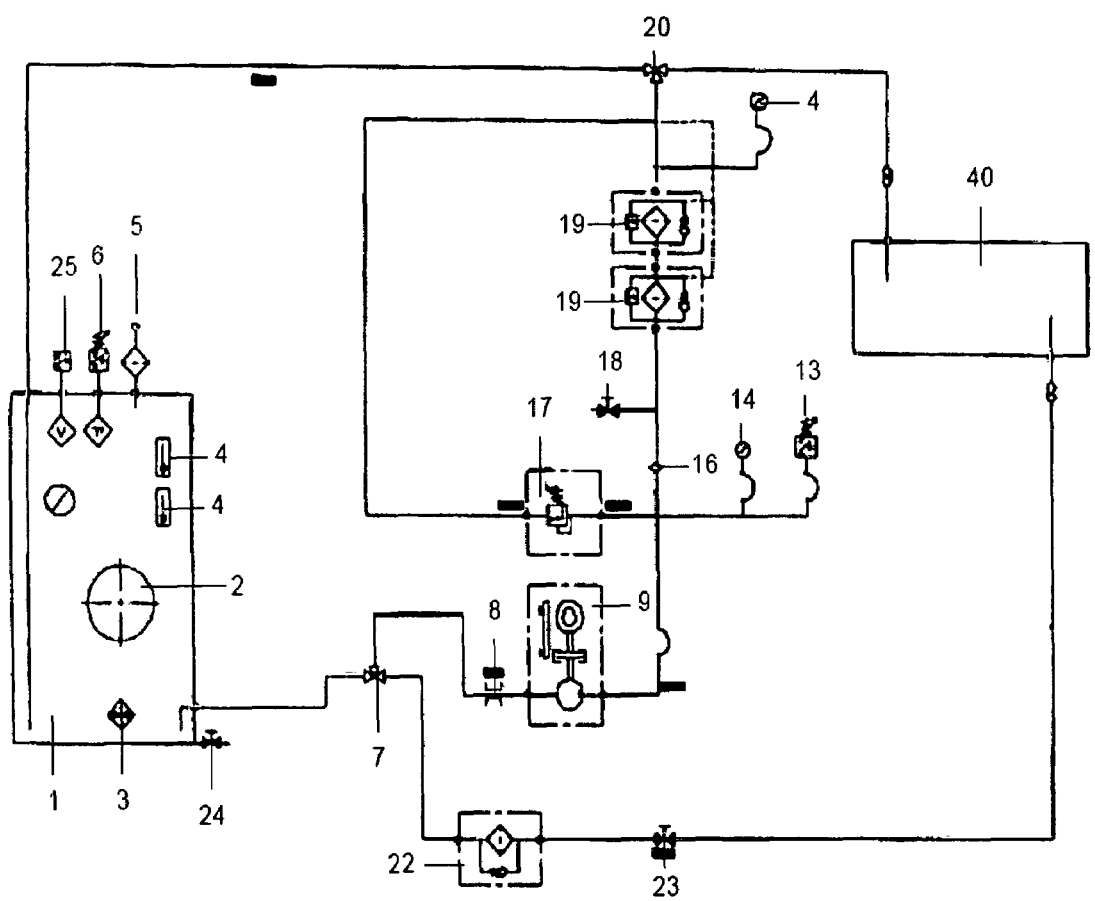
FIG. 2 shows a diagram of the components of the flushing equipment according to the invention.

Below is a detailed description of the invention for flushing equipment for gearboxes of wind turbines which consists of the following components:

Oil tank (1), preferably made from stainless steel and with 1000-litre capacity.
Inlet (2)
Heat Resistor (3)
Electrical and visual levels (4)
Ventilation filters (5)
Thermostat (6)
Three-way valves (7, 20)
Expansion joint (8)
Motor-pump unit (9)
Pressure switches (13, 25)
Manometer (14)
Tubular non-return valve (16)
Safety valve (17)
Shut-off valve (18)
Pressure filters (19)
Vacuum filters (22)
Ball valves (23, 24)
Terminal Box (26)

The equipment allows for four operation modes detailed below.

Figure 3:
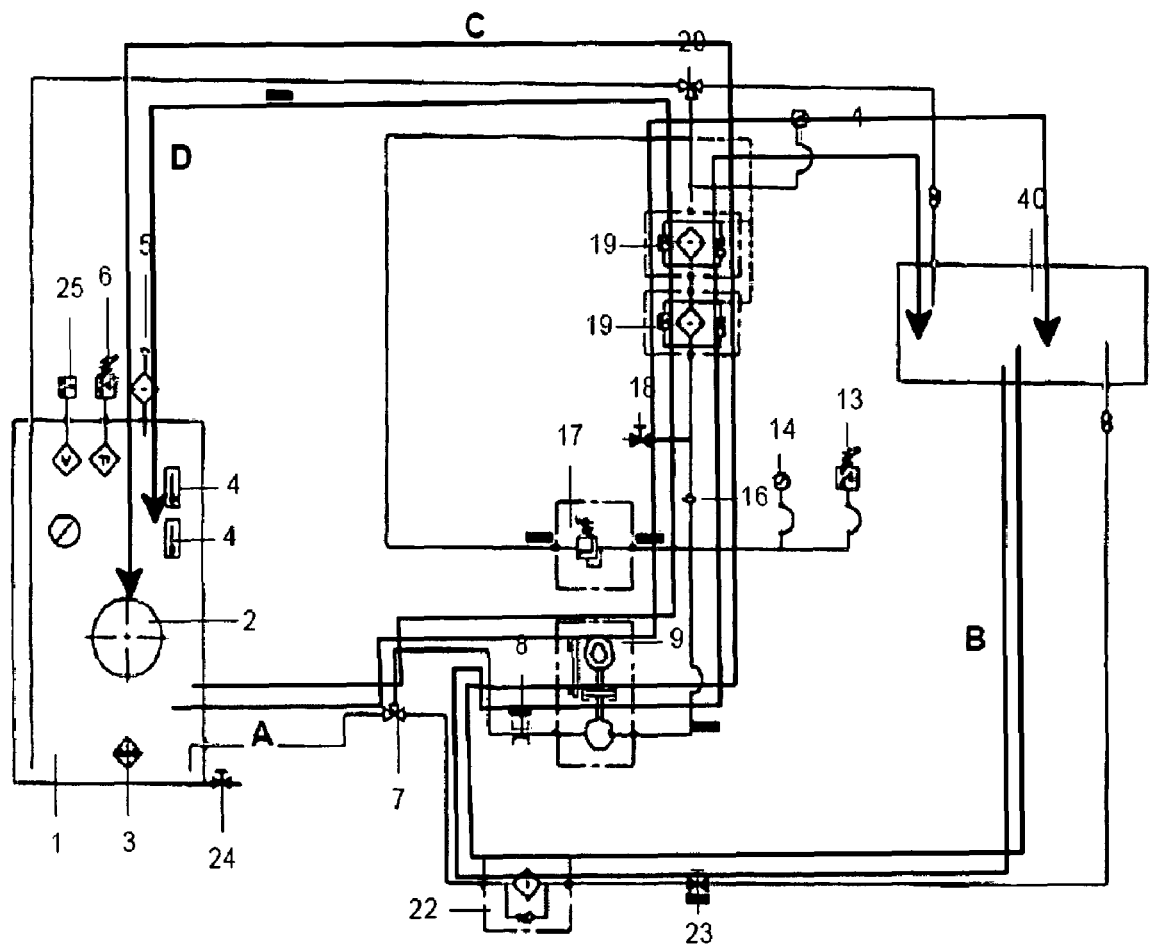
FIG. 3 shows a diagram of the components of the flushing equipment according to the invention and the four operation circuits of the equipment.

The first operation mode, which fills the gearbox (40) with oil, follows the circuit referenced A in FIG. 3. The motor-pump unit (9) circulates the oil from the tank (1) to the gearbox (40) passing through the pressure filters (19).

The second operation mode, which re-circulates the oil through the gearbox (40), follows the circuit referenced B in FIG. 3. The motor-pump unit (9) re-circulates it through the gearbox, passing the oil through the pressure filters (19) in each cycle. This filters (19), arranged in serial in the circuit, are responsible for cleaning the impurities from the lubricant. The body of the filters is made of fibre glass and the absolute filtration efficiency is 3 μm. The maximum flow for the filters (19) is 2000 l/min and the taring pressure for the by-pass is 1.5 bar.

When the oil exits the gearbox (40), it is passed through the vacuum filter (22) used for pre-filtration of the oil therefore preventing the largest impurities from the gearbox (40) from passing through the motor pump unit (9) and damaging it. The filter body (22) is made of stainless steel and has a nominal porosity of 120 μm. The maximum flow for the filter is 500 l/min and the taring pressure for the by-pass is 1.5 bar.

The third operation mode, which empties the gearbox (40) of oil, follows the circuit referenced C in FIG. 3. The motor pump unit (9) empties the oil from the gearbox (40), and after passing it through the vacuum filter (19), as in the case mentioned above, it takes the oil to the tank via the pressure filters (19).

The fourth operation mode, which cleans the oil in the tank (1), follows the circuit referenced D in FIG. 3. This operation mode is merely meant to improve the cleaning of the oil in the tank as far as possible by creating a closed circuit before refilling a new gearbox (40) with oil. The motor-pump unit (9) sucks the oil from the deposit and passes it through the filters (19) before pouring it back into the tank (1).

The motor-pump which operates the four mentioned circuits has a 5 Hz motor with a nominal speed of 1500 rpm and nominal power is 4 Cv. However, the motor pump is used together with a frequency variator making it possible to vary the motor rotating speed in order to vary the pump flow speed. This characteristic enables the equipment to be used for various gearbox modes as the nominal flow varies with each gearbox model from 40 l/min to 120 l/min.

Optionally, the equipment can include a particle counter situated just before the pressure filters (19) which will automatically vacuum a small amount of oil at periodical intervals. All bubbles will be eliminated from the oil and the flow will pass through a particle counter sensor which measures the purity of the oil.

In the implementations we have just described, modifications can be made within the range of the following claims.

The invention claimed is:

1. Oil flushing equipment for machinery with rotating parts (40) which includes a tank (1), a motor-pump unit (9), and oil filtration measures connected to a pipe unit for oil circulation, comprising:

valves (7, 20) included in the pipes which allow the differentiation of a first circuit (A) to fill the machinery (40) with oil from the tank (1) through pressure filters (19), a second circuit (B) for re-circulation of oil through the machinery (40), through the pressure filters (19) and a vacuum filter (22), a third circuit (C) to empty the machinery (40) of oil and take it to the tank (1) passing through the pressure filters (19) and the vacuum filter (22), and a fourth circuit (D) to clean the oil in the tank (1) re-circulating it through the pressure filters (19), wherein the first, second, third, and fourth circuits (A, B, C, D) share the motor pump unit (9) and two pressure filters (19) placed in serial, and the vacuum filter (22), included in the second and third circuits (B,C), is situated between the machine (40) and the motor pump unit (9).

2. Oil flushing equipment for machinery with rotating parts (40) in accordance with claim 1, wherein the motor-pump unit (9) includes means for varying the oil flow between 40 and 120 l/min.

3. Oil flushing equipment for machinery with rotating parts (40) in accordance with claim 1, further comprising a device for measuring oil impurities before their entry into the pressure filters (19) and means for eliminating air bubbles from the oil.

4. Oil flushing equipment for machinery with rotating parts (40) according to claim 1, wherein the machinery (40) is a gearbox for use with a wind turbine.

* * * * *